United States Patent [19]

Warner

[11] 4,430,867
[45] Feb. 14, 1984

[54] AIR CYCLE REFRIGERATION SYSTEM

[75] Inventor: John L. Warner, Simsbury, Conn.

[73] Assignee: United Technologies Corporation, Hartford, Conn.

[21] Appl. No.: 295,299

[22] Filed: Aug. 24, 1981

[51] Int. Cl.³ .................................................. F25D 9/00
[52] U.S. Cl. .......................................... 62/402; 62/172; 62/513
[58] Field of Search .................... 62/86, 87, 402, 113, 62/513, 172

[56] References Cited

U.S. PATENT DOCUMENTS

| | | | |
|---|---|---|---|
| 2,394,253 | 2/1946 | Nettel et al. | 62/402 |
| 2,777,301 | 1/1957 | Kuhn | 62/402 |
| 2,800,002 | 7/1957 | Seed | 62/402 |
| 2,809,714 | 10/1957 | Sims, Jr. et al. | 62/402 |
| 2,829,505 | 4/1958 | Oates, Jr. | 62/402 |
| 2,867,989 | 1/1959 | McGuff | 62/402 |
| 2,873,585 | 2/1959 | Dodge | 62/513 |
| 2,952,981 | 9/1960 | Bartlett, Jr. | 62/86 |
| 2,959,028 | 11/1960 | Begge | 62/402 |
| 2,979,916 | 4/1961 | Mason | 62/172 |
| 2,992,542 | 7/1961 | Arthur | 62/402 |
| 3,097,508 | 7/1963 | Leech et al. | 62/402 |
| 3,165,903 | 1/1965 | Roc et al. | 62/172 |
| 3,177,679 | 4/1965 | Quick et al. | 62/172 |
| 3,208,234 | 9/1965 | Messinger | 62/402 |
| 3,326,109 | 6/1967 | Markham | 62/402 |
| 3,355,905 | 12/1967 | Berhold et al. | 62/172 |
| 3,428,242 | 2/1969 | Rannenberg | 62/402 |
| 3,587,243 | 6/1971 | Keller | 62/402 |
| 3,877,246 | 4/1975 | Leeste | 62/402 |
| 4,018,060 | 4/1977 | Kinsell et al. | 62/172 |

Primary Examiner—Ronald C. Capossela
Attorney, Agent, or Firm—John Swiatocha

[57] ABSTRACT

An air cycle refrigeration system (10) for cooling and ventilating an enclosure such as an aircraft cabin (15) includes a circulation heat exchanger (145) for absorbing heat from air within the cabin, a sink heat exchanger (120) for delivering the heat absorbed from the cabin air to exhaust air from the system's turbine (80) and for melting ice in the exhaust air. A heat exchange liquid circulates through both heat exchangers in a single loop (100). The circulation heat exchanger (145) may be located in the interior of the cabin (15).

2 Claims, 2 Drawing Figures

4,430,867

AIR CYCLE REFRIGERATION SYSTEM

DESCRIPTION

1. Technical Field

This invention relates to turbine driven air cycle refrigeration systems for providing cooling air to a load such as an aircraft cabin or similar enclosure and more particularly to such a refrigeration system wherein the system's turbine discharges at subfreezing temperatures and load air is employed to eliminate ice in the turbine discharge and collateral downstream air handling apparatus.

2. Background Art

The cost and availability of fuel are critical factors in the operation of aircraft and therefore, improved efficiency of operation of aircraft systems is continually after to minimize fuel requirements. In modern transport aircraft, one of the systems which consumes significant power and therefore contributes substantially to fuel demand is the air cycle environmental control system. A major obstacle to the optimization of the efficiency of the air cycle system has been the clogging of system heat exchangers, ducting and the like by ice buildup downstream of the system's expansion turbine outlet. Such ice limits the minimum turbine discharge air temperature and consequently, the maximum supply pressure of the system. Since system efficiency is roughly proportional to supply pressure, such icing necessarily limits the efficiency of the system.

Icing problems have been eliminated to a significant degree by providing the system with a condensing heat exchanger downstream of the turbine exhaust. The heat exchanger is fed with a mixture of chilled turbine exhaust air and warmer cabin (load) recirculation air which melts any ice in the turbine exhaust air. The mixture is cool enough to condense water in a turbine inlet air stream also handled by the condensing heat exchanger. The condensed water is eliminated from the system, thereby minimizing icing in the turbine exhaust for enhanced efficiency. Mixture of the load recirculation air with the turbine exhaust air assures that ice melting is achieved with no loss in total load ventilation air flow. This system is currently manufactured and sold by Hamilton Standard Division of United Technologies under the trademark Recircair and is described fully in U.S. Pat. No. 4,209,993 to Rannenberg. This system shall be used on the Saab-Fairchild 340 and DeHavilland DHC-8 aircraft.

While the system described in the above-noted Rannenberg patent performs efficiently and effectively in such aircraft, a means for providing the high-efficiency performance features of cabin air recirculation to prevent icing downstream of the turbine to aircraft of designs which do not lend themselves to the Rannenberg system was sought. Also sought was a means to provide moisture removal in the cabin air circulation stream. In achieving these two goals, it was sought to make the system compact for ease in installation on existing transport aircraft and capable of providing fresh air (without cabin air recirculation) to selected cabin compartments.

DISCLOSURE OF INVENTION

It is an object of the present invention to provide an improved air cycle refrigeration system of enhanced efficiency due to operation at subzero turbine exhaust air temperatures.

It is another object of the present invention to provide an improved air cycle refrigeration system of enhanced compactness and employing cabin heat for ice removal in the system's turbine exhaust.

It is another object of the present invention to provide such an air cycle refrigeration system which is easily adaptable to a variety of transport aircraft designs.

It is another object of the present invention to provide such an air cycle refrigeration system with a capability for water vapor removal in the cabin air circulation stream.

It is another object of the present invention to provide such an air cycle refrigeration system capable of supplying fresh air (without cabin air recirculation) to selected cabin compartments.

In accordance with the present invention, an air cycle refrigeration system is provided with a load air circulation heat exchanger which absorbs heat from the load (cabin) and a sink heat exchanger which expels the load heat to the system's turbine exhaust with an attendant melting of ice in the exhaust air stream. The two heat exchangers are maintained in heat transfer relationship to each other by a closed loop of liquid heat exchange fluid circulating through both heat exchangers, the liquid heat exchange fluid absorbing heat from the system's load and delivering that heat to the turbine exhaust. The liquid heat exchange fluid loop allows such heat transfer from the load to the turbine exhaust without penetration of any cabin bulkheads by the relatively large diameter air ducting employed in channeling cabin recirculation air to the turbine exhaust. In the preferred embodiment, a condenser heat exchanger is employed upstream of the system's turbine for absorbing heat from the turbine inlet air. The liquid heat exchange fluid also circulates through the condenser heat exchanger for cooling the turbine inlet air for the condensation and ultimate removal of water vapor therefrom.

Other objects and advantages of the present invention will become more readily apparent from the following detailed description taken in connection with the accompanying claims and drawing.

BEST MODE OF CARRYING OUT THE INVENTION

Figure 1:
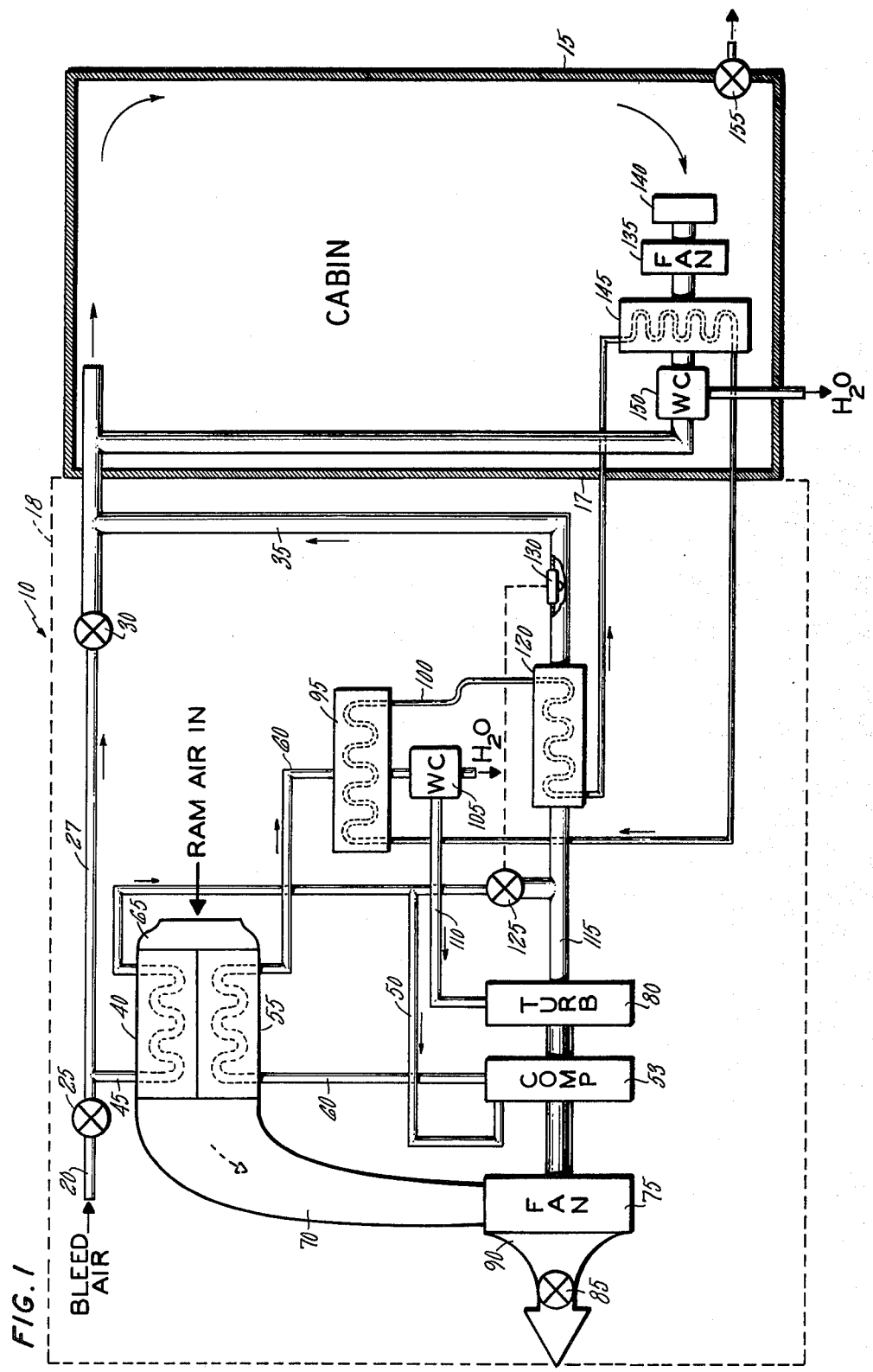
FIG. 1 is a schematic diagram of a preferred embodiment of the air cycle refrigeration system of the present invention.

Referring to FIG. 1, the air cycle refrigeration system of the present invention is shown generally at 10, employed in the cooling and pressurizing of a load such as an aircraft cabin or similar enclosure 15, which is separated by bulkhead 17 from an unpressurized region 18 in which the system's turbo-compressor unit is located. The system is supplied with air, such as bleed air from the compressor section of the gas turbine engine through inlet line 20, the flow through line 20 being controlled by valve or flow controller 25. Valve 25 may be of any known type such as a flapper or butterfly valve. The supply air stream is split downstream of valve 25, a portion of the stream being channeled by conduit 27 through zone trim valve 30, for supply to the cabin along with the output of the refrigeration system exhausted therefrom through line 35. The remainder of the inlet air is channeled through a primary heat exchanger 40 through line 45. In primary heat exchanger 40, the supply air is cooled by a flow of ambient air such as engine ram air. The supply air stream is then split, a portion thereof being channeled through line 50 to the refrigeration system's compressor 53 where the air is compressed with a resultant heating thereof. The compressed air is then cooled by flow through secondary heat exchanger 55 by means of line 60. The compressed air is cooled in the secondary heat exchanger by ambient air such as the engine ram air described hereinabove. As shown, primary and secondary heat exchangers 40 and 55 may be housed in a single unit, ram air being supplied to that unit through inlet 65. Upon discharge from heat exchangers 40 and 55, the ram air is channeled through duct 70, at the termination of which a fan 75 may be provided to enhance and maintain the continuity of air flow through the heat exchangers. Fan 75 is driven with compressor 53 by the system's expansion turbine 80. A flow control valve 85 disposed in fan outlet duct 90 may be employed to control the flow of cooling air through heat exchangers 40 and 55. From heat exchanger 55, the system air flow is channeled through condensing heat exchanger (condenser) 95 where the air is cooled by a flow through the condenser of a liquid heat exchange fluid such as water or a glycol-water solution circulating through conduit or closed loop 100. Cooling of the system air flow in condenser 95 causes the condensation of water vapor in the air flow before the flow enters the turbine, the condensate being collected in water collector 105. From water collector 105 the air is channeled through duct 110 to turbine 80 where the air is expanded with a resultant cooling thereof to temperatures in, for example, the neighborhood of $-35°$ F. The system air flow is exhausted from turbine 80 through conduit 115 and sink heat exchanger 120 where heat is absorbed by the turbine discharge air from the heat exchange liquid in loop 100. From sink exchanger 120, the turbine exhaust air is ducted through conduit 35 to the junction of conduits 27 and 35 where the exhaust air is mixed with inlet (bleed) air for admission to the cabin for the pressurization and cooling thereof. Zone trim valve 30 admits the proper amount of inlet air to the cabin in response to a thermostat (not shown) located in the cabin for tempering the turbine exhaust air in conduit 35 to the required temperature.

That portion of the inlet air cooled in primary heat exchanger 40, which is not ducted to the compressor through line 50 is channeled to temperature control valve 125, operated by a suitable actuator (not shown) which receives an input signal from temperature sensor 130 located downstream of sink heat exchanger 120 in conduit 115. Sensor 130 is set at a temperature such as, for example, 35° F. (2° C.) to prevent icing at both heat exchanger 120 and the inlet to the cabin.

The cabin is provided with a recirculation fan 135 which draws air through a filter 140 to a cabin air circulating heat exchanger 145, through which the liquid heat exchange fluid circulating in conduit 100 also flows. The heat exchange fluid cools the cabin air, the heat absorbed by the heat exchange fluid in exchanger 145 being ultimately rejected to the turbine exhaust air stream in heat exchanger 120 in the manner described hereinabove to dispose of that heat and to prevent icing in the exhaust air stream. Cooling of cabin air in heat exchanger 145 results in condensation of water vapor therein, this condensation being removed from the heat exchanger by water collector 150. Stale cabin air is vented through a cabin pressure regulator 155.

Summarizing the operation of heat exchangers 95, 120 and 145, liquid heat exchange fluid circulated through loop 100, absorbs heat in heat exchangers 95 and 145 to cool turbine inlet flow and cabin circulation flow, respectively, and rejects heat in sink heat exchanger 120 warming the turbine exhaust, thereby preventing icing. In this regard, the air cycle refrigeration system of the present invention performs a function similar to that of the system disclosed in the abovenoted Rannenberg patent. However, it is noted that in the system of that patent, cabin air is actually ducted to the turbine exhaust air conduit for mixture with that air and flow through a condensing heat exchanger. It will be appreciated that such cabin air recirculation flow necessarily requires penetration of the bulkhead by a recirculation air conduit, generally in the neighborhood of 20 square inches in a cross section. While this penetration may be unobjectionable where the aircraft and its cabin are designed in contemplation of such an air cycle refrigeration system, it will be seen that cabins of existing aircraft not designed with such a system in mind may be unadaptable to bulkhead penetration by two air conduits of such cross section.

However, with the system of the present invention, it is seen that the single heat exchange fluid loop operating through heat exchangers 95, 120 and 145 allows heat exchanger 145 to be located internally of the cabin with fan 135, circulating air within the cabin without any air duct connections of the cabin with the refrigeration system other than that through which system exhaust sir is admitted to the cabin. Cabin air is circulated entirely within the cabin, and therefore, the bulkhead is penetrated by only a single air duct and the liquid lines of loop 100 which lines are typically on the order of only 2 square inches in cross section. Furthermore, location of heat exchanger 145 in the cabin allows dehumidification of cabin air within the cabin in addition to the dehumidification downstream of condensing heat exchanger 95 for enhanced humidity control. The system of the present invention is also readily adaptable to manufacture in a single unit or pack with primary and secondary heat exchangers 40 and 55, compressor 53 and turbine 80, since heat exchangers 95 and 120, employing a liquid heat exchange fluid may be made quite compact for ease in accommodation with remaining system hardware. In this regard, heat exchanger 120 may be made so compact as to fit within a standard system envelope between the turbine exhaust port and temperature sensor 130 in conduit 115. The air cycle refrigeration system of the present invention is also particularly well adapted to aircraft wherein completely fresh air is required to be supplied to a cabin compartment such as the cockpit. With the system of the present invention, such fresh cockpit air can be readily tapped off line 35 without any loss of system performance such as, for example, loss of ventilation due to the utilization of cabin air to warm the fresh turbine exhaust air sufficiently for cockpit use.

Figure 2:
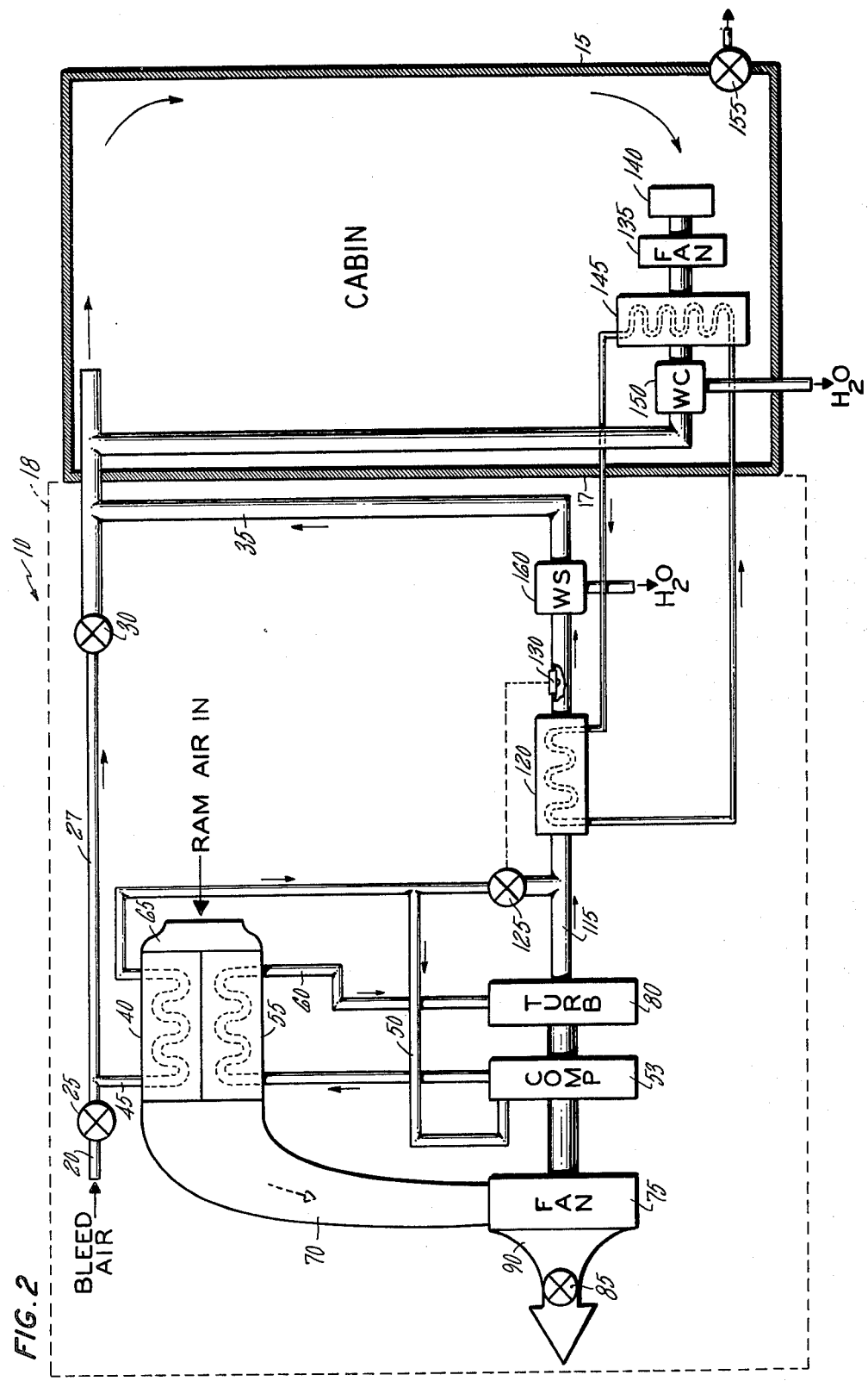
FIG. 2 is a schematic diagram of an alternate embodiment of the system of the present invention.

Referring to FIG. 2, an alternate embodiment of the air cycle refrigeration system of the present invention is shown, corresponding components in FIGS. 1 and 2 being referenced by the same numeral. In FIG. 2, condensing heat exchanger 95 and water collector 105 are eliminated, air flow through line 60 being fed directly to the turbine through secondary heat exchanger 55. It will be understood, of course, that the system air expanded by turbine 80 will have much more water vapor entrained therein than if condensing heat exchanger 95 had been employed. However, sink heat exchanger 120 warms the turbine exhaust flow through conduit 115 sufficiently to melt the ice in that flow, thereby preventing icing within line 115 and heat exchanger 120. Icing at the turbine exhaust itself is prevented by the close proximity thereto of sink heat exchanger 120. The melted ice is removed from the air stream by water separator 160 of any known variety such as a centrifugal separator or one employing known coalescers such as a coalescing cloth or the like. It will be understood that the elimination of condensing heat exchanger 95 does not detract from the present invention. That is, enhanced humidity control by the removal of water vapor from cabin air is unaffected. Likewise, this alternate system requires no penetration of cabin bulkheads by air ducts other than that through which system exhaust air is admitted to the cabin, the only other penetration being by the lines of heat exchange fluid loop 100. Furthermore, the compactness of the system is maintained and the system may be even more adaptable to existing aircraft than that shown in FIG. 1 since water separator 160 may, in some instances, be more readily accommodated in the system envelope than the condensing heat exchanger 95. As in the embodiment shown in FIG. 1, ventilation of a particular cabin compartment can be tapped off line 35 anywhere along the length thereof.

Having thus described the invention, what is claimed is:

1. An air cycle refrigeration system wherein pressurized air is received by said system, expanded and cooled in a turbine and exhausted through an outlet of said turbine to an enclosure, said system including means for circulating air within said enclosure and being characterized by:

a circulation heat exchanger communicating with said enclosure air for absorbing heat therefrom;

a sink heat exchanger communicating with said turbine exhaust air for delivering heat thereto;

a condensing heat exchanger communicating upstream of said turbine with turbine inlet air for absorbing heat therefrom; and a liquid heat exchange medium circulating in a closed loop through said circulation and sink heat exchangers, said liquid medium transferring heat absorbed from said enclosure air to said turbine exhaust for the simultaneous cooling of said enclosure air and warming said turbine exhaust for the melting of ice therein, said liquid heat exchange medium circulating through said condensing heat exchanger serially with said circulation and sink heat exchangers for cooling said turbine inlet air for the removal of water therefrom simultaneously with said cooling of said enclosure air and said warming of said turbine exhaust air.

2. The air cycle refrigeration system of claim 1 further characterized by said circulation heat exchanger being disposed interiorly of said enclosure, and said sink heat exchanger being disposed exteriorly of said enclosure whereby communication between said first and second heat exchangers for heat transport therebetween requires penetration of said enclosure by liquid conduits only.

* * * * *